Dec. 15, 1959 C. M. TERRY 2,917,075
FLOW CONTROL VALVE
Filed June 15, 1959

INVENTOR.
Charles M. Terry
BY
Hofgren, Brady, Wegner, Allen & Stellman
Attys.

2,917,075
FLOW CONTROL VALVE

Charles M. Terry, Decatur, Ill., assignor to A. W. Cash Valve Manufacturing Corporation, a corporation of Illinois Application June 15, 1959, Serial No. 820,317

6 Claims. (Cl. 137—504)

This invention relates to a flow control valve, and more particularly, to an improved flow control valve for used in a fluid system, for maintaining a predetermined rate of liquid flow with only the slightest variation.

A primary object of this invention is to provide a new and improved flow control valve having a minimum number of easily formed and assembled parts.

Another object of this invention is to provide a simple and reliable flow control valve in which a more nearly perfect pressure balance between inlet and outlet pressures is maintained and accurate control is obtained without limitation by clearance tolerances between valve parts.

A further object of the invention is to provide an improved flow control valve having a hollow valve member slidably mounted in a chamber and a valve seating member mounted in the chamber generally coaxially with the valve member, said valve seating member being movable laterally relative to the valve member whereby closure of the valve member on the valve seating member shifts the valve seating member to a concentric relation with the valve member to assure positive seating therebetween.

The invention is illustrated in the accompanying drawing, in which:

Fig. 1 is a plan view of a flow control valve embodying the invention; and

Fig. 2 is a longitudinal sectional view taken substantially along line 2—2 of Fig. 1.

The flow control valve of the present invention includes generally, a hollow valve member 28, slidably mounted in an inlet chamber 10a, and having a conical valve seat with surface 31 which is movable toward and away from a valve seating member 32 to control the flow from the valve. An end wall 30 on the inlet end of the valve member is provided with a centrally disposed flow restricting orifice 29 which permits incoming fluid to pass through the hollow valve member 28 and then through an outlet 20 when the valve member is in the open position. When the inlet pressure increases to a predetermined level over the pressure within the hollow valve member 28, the inlet pressure causes valve member 28 to assume a more closed position thereby controlling the outlet rate of flow. In order to increase accuracy of the valve, the valve seating member 32 is shiftably mounted whereby it may be shifted into perfect alignment with the valve member. Details of the parts, and operation of the novel seating arrangement will be more apparent from the following description.

In the flow control valve illustrated in Figs. 1 and 2, a valve casing 10 has a cylindrical inlet chamber 10a therein and is connected to an outlet casing 11 which is provided with a cylindrical outlet chamber 11a of a diameter larger than that of the inlet chamber 10a with both chambers forming a single multi-diameter chamber. A portion of the valve casing 10 forms an annular shoulder 17 between the chambers 10a and 11a, and at the junction of the two casings an O-ring gasket 12 surrounding the shoulder 17 provides a fluid-tight seal. Threaded fasteners 26 secure a cover plate 25 and the casings 10 and 11 together, the fasteners being engaged in the valve casing 10. The inlet end of the valve casing 10 is provided with an inlet port 13 in an end wall 14 and an externally threaded boss 18. A fluid-carrying conduit 15 is connected to the inlet port 13 by a compression-type fastener, generally shown at 16, which is of a type commonly used, said fastener being connected to the threaded boss 18.

The outlet casing 11 is provided with an outlet port 20 in an outwardly extending threaded nipple 19, to which is connected a conduit, not shown. The end wall 21 of outlet casing 11 is provided with a centrally disposed bore 22 which receives a stem 23 of an adjusting screw 24 extending through a threaded bore in the cover plate 25. An O-ring gasket 27 disposed between the cover plate 25 and outlet casing 11, adjacent stem 23, provides a fluid tight seal.

The hollow valve member 28 having a front wall 30, is slidably mounted in the valve chamber 10a, the front wall 30 being provided with a centrally disposed flow resisting orifice 29 which confronts the inlet port 13. The opposite open end of valve member 28 is carried in the outlet chamber 11a, and is provided with an outwardly extending annular flange 28a which abuts shoulder 17 when the valve member 28 is in its fully open position, thus retaining the front wall 30 away from the inlet wall 14 of the inlet chamber 10a at all times, which permits fluid pressure to be applied to the entire face of the front wall 30 of the valve member 28. A plurality of radial passages 36 connect the interior of the valve member 28 with the slight clearance space between the valve member and the inside wall of valve casing 10, to subject the pressure of any leakage in this space to the pressures at opposite sides of orifice 29. The flanged end of the valve member 28 is provided with an interior conical valve seat 31 formed by an inclined interior surface to coact with a valve seating member 32.

Valve seating member 32 is provided with a sharp annular edge confronting the valve seat 31 for line contact with the valve seat. The valve seating member 32, having a concentric rim 32a adjacent the end wall 21 of the outlet casing 11, is loosely mounted on the stem 23 of the adjusting screw 24, whereby a slight lateral movement of the valve seating member 32 relative to the valve seat 31 is permitted, as caused by the valve member to place the seating member 32 exactly concentric with the valve member.

An annular collar 33 on the inner portion of the stem 23 acts as a retaining surface for a helical valve spring 34 which bears on one end against said collar and on the other end against the inner surface of the front wall 30 within the hollow valve member 28. The spring 34 urges the valve member 28 to its open position. The compression on the spring can be changed by adjusting screw 24, to set the predetermined rate of flow.

A second helical spring 35 bears on its one end on the opposite side of shoulder 33 and on its other end against the valve seating member 32 thereby retaining the annular rim 32a of the valve seating member 32 in contact with the outlet casing wall 21.

Operation

The flow control valve, as an example may be used in a beverage dispenser whereby fluid under pressure will enter the valve with the outlet side of the valve being connected to an on-off dispensing valve. When the dispensing valve is opened, the flow control valve becomes operative to insure a certain amount of fluid to flow for a unit of time.

The compression of the valve spring 34 is set by adjusting screw 24 to determine the desired pressure differential to be maintained between the pressures existing on opposite sides of the orifice 29. When the valve is operating with the fluid entering the inlet port 13 at a constant pressure, the valve seat 31 of the hollow valve member 28 will be positioned away from the sharp-edged valve seating member 32 to permit a constant rate of flow of fluid through the orifice 13 to pass out through the outlet port 20. An increase in pressure of the fluid in the inlet port 13 will act upon the end wall 30 of the valve member 28 to shift the valve seat 31 toward the valve seating member 32 so as to restrict the flow of the fluid to the outlet 20 until pressure builds up sufficiently within the hollow valve member 28 to restore the predetermined differential pressure, at opposite sides of orifice 29.

The valve seating member 32, being movable laterally relative to the valve seat 31, will assume a concentric relation with the valve seat when the conical surface of the valve seat contacts the sharp edge of the valve seating member 32. Fluid on both faces of the valve seating member 32 being at the same pressure permits the valve seat to move to its concentric position more freely, with the annular rim 32a being held in intimate contact with the end wall 21 and concentric with the valve seat 31 by the spring 35.

The valve seating area is substantially the same as the area of the front wall 30 of valve member 28, thus providing a balanced valve that is substantially unaffected by variations in the pressure within the hollow valve member or the outlet pressure.

The foregoing detailed description is given for clearness of understanding only, and no unnecessary limitations should be understood therefrom, for some modification will be obvious to those skilled in the art.

I claim:

1. A flow control valve comprising: a casing having a chamber; fluid inlet and outlet ports communicating with said chamber; a hollow valve member slidably mounted in said chamber, said valve member being provided with an end wall confronting the inlet port, said end wall having a restricted passage relative to the inlet port, the opposite end of the valve member having a conical valve seat formed by an inclined surface; a valve seating member loosely mounted in the chamber generally coaxially with said valve seat, said valve seating member being movable laterally relative to said valve seat whereby closure of said valve seat on said valve seating member shifts said valve seating member to a concentric relation with the valve seat to obtain alignment therebetween; and means for urging said valve member to open position.

2. A device as specified in claim 1, in which the valve seating member has a sharp annular edge for line contact with the valve seat.

3. A flow control valve comprising: a casing having a chamber and an opening at one end; fluid inlet and outlet ports communicating with said chamber; a multiple diameter hollow valve member slidably mounted in said chamber, said valve member being provided with an end wall confronting the inlet port and having a restricted passage relative to the inlet port, the opposite end of the valve member having an interior conical valve seat formed by an inclined interior surface; a spring extending within the hollow valve member and engageable therewith; an adjusting member extending within said opening and in engagement with the spring to vary the spring compression; and a cylindrical disc as a valve seating member confronting the valve seat and loosely mounted on said adjusting member, said disc being movable laterally relative to said valve seat whereby closure of said valve member on said valve seating member shifts said seating member to a concentric relation with the valve seat.

4. A device as specified in claim 3 in which the cylindrical disc is provided with a sharp annular edge confronting the valve seat so as to make line contact with the valve seat, the diameter of said edge being equal to the diameter of the end wall of said valve member.

5. A device as specified in claim 3, in which the disc is provided with an annular rim on the side adjacent the casing wall forming a pocket between said disc and casing wall thus permitting substantially equal fluid pressure on both sides of the disc whereby the disc more freely seats concentrically on said valve seat.

6. A device as specified in claim 3, in which the adjusting member is provided with an annular collar, said collar being in engagement with the spring to vary the compression, and a second spring extending between the collar and the valve seating member to retain the valve seating member in contact with the casing wall.

References Cited in the file of this patent

UNITED STATES PATENTS

| | | |
|---|---|---|
| 2,198,487 | Sisk | Apr. 23, 1940 |
| 2,330,610 | Natter | Sept. 28, 1943 |
| 2,872,939 | Terry | Feb. 10, 1959 |